US009776360B2

(12) United States Patent
Yang et al.

(10) Patent No.: US 9,776,360 B2
(45) Date of Patent: Oct. 3, 2017

(54) TRANSFER PRINTING APPARATUS AND MANUFACTURING METHOD OF LIGHT GUIDING FILM

(71) Applicants:Ching-Tang Yang, Hsin-Chu (TW); Fang-Hsuan Su, Hsin-Chu (TW); Shang-Wei Chen, Hsin-Chu (TW); Min-Yi Hsu, Hsin-Chu (TW)

(72) Inventors: Ching-Tang Yang, Hsin-Chu (TW); Fang-Hsuan Su, Hsin-Chu (TW); Shang-Wei Chen, Hsin-Chu (TW); Min-Yi Hsu, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 488 days.

(21) Appl. No.: 14/277,802

(22) Filed: May 15, 2014

(65) Prior Publication Data

US 2014/0349027 A1 Nov. 27, 2014

(30) Foreign Application Priority Data

May 24, 2013 (TW) .............................. 102118460 A

(51) Int. Cl.
*B29C 59/02* (2006.01)
*B29C 59/04* (2006.01)
(Continued)

(52) U.S. Cl.
CPC ........ *B29C 59/022* (2013.01); *B29C 37/0053* (2013.01); *B29C 59/046* (2013.01);
(Continued)

(58) Field of Classification Search
CPC ... B29D 11/00663; G02B 6/00–6/0096; B29C 59/00–59/18
See application file for complete search history.

(56) References Cited

U.S. PATENT DOCUMENTS

| 2010/0104812 A1* | 4/2010 | Sung | B29D 11/00663 428/156 |
| 2010/0316755 A1* | 12/2010 | Chen | B29C 45/0046 425/120 |
| 2012/0286436 A1* | 11/2012 | Chen | B29D 11/00288 264/1.24 |

FOREIGN PATENT DOCUMENTS

| CN | 102896776 | 1/2013 |
| CN | 202915273 | 5/2013 |

(Continued)

OTHER PUBLICATIONS

Machine translation CN202915273. pp. 1-8.*

(Continued)

*Primary Examiner* — Elizabeth Burkhart
(74) *Attorney, Agent, or Firm* — Jianq Chyun IP Office

(57) ABSTRACT

A transfer printing apparatus includes a mold, a stamper, a pressing roller and a curing unit. The mold has a first surface with first and second concavities, the second concavity has first and second planes, the first plane is perpendicular to the first surface, and the second plane is inclined to the first surface. The stamper having a second surface is disposed in the first concavity. The first and second surfaces are coplanar, and the second surface has transfer printing microstructures. The first and second surfaces are suitable for coated an adhesive layer. The pressing roller presses a base film onto the adhesive layer, such that the adhesive layer is integrated with the base film. The curing unit cures the adhesive layer on the base film, such that a taper corresponding to the second concavity and optical microstructures corresponding to the transfer printing microstructures are formed on the adhesive layer.

14 Claims, 6 Drawing Sheets

(51) Int. Cl.
*B29C 37/00* (2006.01)
*B29D 11/00* (2006.01)
*F21V 8/00* (2006.01)
*B29L 11/00* (2006.01)
*B29K 105/24* (2006.01)
*B29K 105/00* (2006.01)
*B29C 35/08* (2006.01)

(52) U.S. Cl.
CPC .. *B29D 11/00326* (2013.01); *B29D 11/00663* (2013.01); *G02B 6/0038* (2013.01); *G02B 6/0065* (2013.01); *B29C 2035/0827* (2013.01); *B29C 2059/023* (2013.01); *B29K 2105/0097* (2013.01); *B29K 2105/246* (2013.01); *B29L 2011/0075* (2013.01)

(56) References Cited

FOREIGN PATENT DOCUMENTS

| | | |
|---|---|---|
| TW | 274255 | 4/1996 |
| TW | 290815 | 11/1996 |
| TW | M256280 | 2/2005 |
| TW | I249658 | 2/2006 |
| TW | M303814 | 1/2007 |
| TW | M351374 | 2/2009 |
| TW | 200918311 | 5/2009 |
| TW | 201122671 | 7/2011 |
| TW | I346040 | 8/2011 |
| TW | M411335 | 9/2011 |
| TW | 201208861 | 3/2012 |
| TW | 201305622 | 2/2013 |
| TW | M446697 | 2/2013 |
| TW | 201310093 | 3/2013 |

OTHER PUBLICATIONS

"Office Action of China Counterpart Application", dated Dec. 23, 2015, p. 1-p. 9.
"Office Action of Taiwan Counterpart Application", dated Sep. 8, 2015, p. 1-p. 13.

* cited by examiner

TRANSFER PRINTING APPARATUS AND MANUFACTURING METHOD OF LIGHT GUIDING FILM

CROSS-REFERENCE TO RELATED APPLICATION

This application claims the priority benefit of Taiwan application serial no. 102118460, filed on May 24, 2013. The entirety of the above-mentioned patent application is hereby incorporated by reference herein and made a part of this specification.

BACKGROUND OF THE INVENTION

Field of the Invention

The invention relates to a transfer printing apparatus and a manufacturing method, and more particularly, to a transfer printing apparatus suitable for light guiding film and a manufacturing method of light guiding film.

Description of Related Art

With rapid progress in display techniques, the flat panel display has become the mainstream among various displays and replaced the cathode ray tube (CRT). Among various flat panel displays, the liquid crystal display (LCD) has been deeply favored by the consumers for usage. Generally, the LCD is mainly formed by a backlight module and a liquid crystal display. Since the LCD does not emit light by itself, it is required that the backlight module provides a light source required for displaying.

In a design trend of making a portable electronic device thinner, a thickness of a light guiding film (LGF) in the backlight module is reduced accordingly to be smaller than a size of the light source (e.g., a LED light source). In order to cover a range where the light source being located with a light incidence side of the light guiding film, a taper is required to be disposed on a light emitting surface of the light guiding film adjacent to the light incidence side, so that light emitted by the light source can enter the light guiding film more completely. Currently, a manufacturing method of the taper is mostly done by injection molding method, however, it is difficult to manufacture a thinner light guiding film and the taper thereof since a minimum thickness of the light guiding film manufactured by the injection molding method is approximate 0.4 to 0.5 mm. Furthermore, in case convex microstructures on the light guiding film are manufactured with a transfer printing method, corresponding transfer printing microstructures are generally engraved on a transfer printing roller directly, such that the transfer printing roller may then be utilized to transfer print the convex microstructures on the light guiding film. Accordingly, when it is required to alter a distribution manner or structure shape of the optical microstructures on the light guiding film, since the transfer printing roller needs to be re-engraved, the manufacturing cost is increased.

Furthermore, in a conventional backlight module, convex (or concave) microstructures are usually disposed on a bottom surface of the light guiding film so that light emitted by the light source can be reflected by the convex (or concave) microstructures to travel towards the light emitting surface after entering the light guiding film, and the convex microstructures are disposed on the light emitting surface of the light guiding film so the light is emitted more uniformly to further improve a luminosity. However, because the convex (or concave) microstructures disposed on the bottom surface of the light guiding film is generally being non-uniformly arranged, when the convex (or concave) microstructures are manufactured on the bottom surface of the light guiding film, a positioning process with the taper on the light emitting surface of light guide film is required, and even slight errors on the positioning may result in a bad influence to the light emitting efficiency. Moreover, in comparison with the convex microstructures being disposed on the light guiding film, generally, a more preferable light emitting efficiency may be obtained by disposing the concave microstructures on the light guiding film. However, in case the concave microstructures are disposed on the bottom surface of the light guiding film so as to obtain the more preferable light emitting efficiency, an issue that the light is emitted non-uniformly may arise due to electrostatic adhesion between the bottom surface of the light guiding film and a reflector.

Taiwan Patent No. TW 201305622 A1 discloses a manufacturing method of transparent substrate, in which a transparent substrate is manufactured into a mold core after the mold core is filled with a material, then the material is cured to form a taper portion on the transparent substrate, and optical microstructures are transfer printed on the transparent substrate through on an inner surface of the mold core. Taiwan Patent No. TW M256280 discloses a light guiding plate mold including an upper mold, a lower mold and a platen, in which the platen is located at the lower mold and has a plurality of microstructure patterns for manufacturing optical microstructures on a surface of the light guiding plate. Taiwan Patent No. TW M446697U1 discloses a manufacturing process of light guiding plate having a stamper rolled by a transport roller, in which when a substrate is delivered by a delivery device to pass a rolling device, the stamper presses a resin layer on the substrate, and an ultraviolet light source emits an ultraviolet light to the resin layer so as to cure the resin layer. Taiwan Patent No. TW 290815 discloses a mold set having a mold core which is capable of being detachably assembled according to variations required for desired shapes and styles. Taiwan Patent No. TW 274255 discloses a punching mechanism capable of forming 3-D textures on a texture mold for desired textures, and forming one single 3-D texture plastic tile by punching patterns with 3-D textures on the texture mold being continuously transported on a leather belt and cutting a resultant of above into a 3-D block by using a knife mold. Taiwan Patent No. TW I249658 discloses a manufacturing method of matrix substrate unit, in which a UV adhesive is coated on a surface of a matrix mold having textures, and a transparent substrate is covered on the UV adhesive; and the UV adhesive is separated from the matrix mold after the UV adhesive is cured, so that the textures of the matrix mold can be completely copied onto the UV adhesive. Taiwan Patent No. TW I346040B1 discloses a manufacturing method of brightening film, in which a modeling adhesive is coated on a release film of a transparent material and released by a releasing wheel of the release film; after being cured by irradiating with a UV light, the modeling adhesive is accommodated together with the release film then cut into a plurality of brightening films. Taiwan Patent No. TW M351374 discloses a manufacturing apparatus of optical film, in which a substrate enters a mirror wheel along a transport direction, and an included angle between the transport direction and a curved line of the mirror wheel proximate to the substrate is 10 to 60 degrees or 30 to 60 degrees. Taiwan Patent No. TW M411335 discloses an embossing machine which presses a pending object by a pressing wheel through a pressing film, and cures a thermosetting collosol layer on the pending object by utilizing a UV light.

SUMMARY OF THE INVENTION

The invention provides a transfer printing apparatus and a manufacturing method of light guiding method, which are capable of simplifying manufacturing process of a light guiding film and manufacturing the light guiding film having an excellent luminosity.

Other objects and advantages of the invention can be further illustrated by the technical features broadly embodied and described as follows.

In order to achieve one or a part of or all of the above advantages or other advantages, an embodiment of the invention provides a transfer printing apparatus including a mold, a stamper, a pressing roller and a curing unit. The mold has a first surface with a first concavity and a second concavity, the second concavity has a first plane and a second plane, the first plane is perpendicular to the first surface, and the second plane is inclined to the first surface. The stamper has a second surface and is disposed in the first concavity. The first surface and second surface are coplanar, and the second surface has a plurality of transfer printing microstructures. The first and second surfaces are suitable to be coated with an adhesive layer. The pressing roller is suitable to press a base film onto the adhesive layer, such that the adhesive layer is integrated with the base film. The curing unit is suitable to cure the adhesive layer on the base film, such that a taper corresponding to the second concavity and a plurality of optical microstructures corresponding to the transfer printing microstructures are formed on the adhesive layer.

In order to achieve one or a portion of or all of the objects or other objects, an embodiment of the invention is directed to a manufacturing method of light guiding film including the following steps. A base film is provided, in which the base film has a light emitting surface and a bottom surface opposite to each other. A first adhesive layer is coated on the bottom surface of the base film. A transfer printing roller is provided, in which a plurality of first transfer printing microstructures are provided on the transfer printing roller. A plurality of first optical microstructures corresponding to the first transfer printing microstructures on the first adhesive layer are formed by performing transfer printing to the first adhesive layer on the bottom surface of the base film by the transfer printing roller and curing the first adhesive layer. A mold is provided, in which the mold has a first surface, and the first surface has a first concavity and a second concavity. A stamper is provided, in which the stamper has a second surface, and a plurality of second transfer printing microstructures are provided on the second surface. The stamper is disposed in the first concavity, such that the first surface and the second surface are coplanar. A second adhesive is coated on the first surface and the second surface. The light emitting surface of the base film is pressed onto the second adhesive layer by a pressing roller and curing the second adhesive layer, such that the second adhesive are integrated with the light emitting surface and a taper corresponding to the second concavity and a plurality of second optical microstructures corresponding to the second transfer printing microstructures are formed on the second adhesive layer. The base film are cut to manufacture at least one light guiding film after the first optical microstructures, the taper and the second optical microstructures are formed.

In the transfer printing apparatus according an embodiment of the invention, at least one transport roller is further included, in which the base film is a flexible film and rolled by the transport roller and the pressing roller, and the transport roller being suitable to drive the base film to move and pass the pressing roller.

In the transfer printing apparatus according an embodiment of the invention, the mold is suitable to move with the base film synchronously when the pressing roller presses the base film, such that the adhesive layer is completely integrated with the base film.

In the transfer printing apparatus according an embodiment of the invention, the adhesive layer is a light curing adhesive film, and the curing unit is suitable to emit a light to cure the adhesive layer.

In the transfer printing apparatus according an embodiment of the invention, a cutting unit is further included, in which after the adhesive layer is cured by the curing unit, the cutting unit is suitable to cut the base film to manufacture at least one light guiding film.

In the transfer printing apparatus according an embodiment of the invention, the mold includes a first component and a second component, and the first concavity is located at the first component, and the second concavity is located at the second component, and the first component is suitable to be assembled to the second component.

In the transfer printing apparatus according an embodiment of the invention, at least one adhesive material is further included and filled at a gap between an inner wall of the first concavity and the stamper.

In the transfer printing apparatus according an embodiment of the invention, the adhesive material is a light curing adhesive material.

In the transfer printing apparatus according an embodiment of the invention, the second plane is located between the first plane and the first concavity.

In the transfer printing apparatus according an embodiment of the invention, an included angle between the second plane and the first surface is between 2.5 degrees to 5 degrees.

In the transfer printing apparatus according an embodiment of the invention, each of the transfer printing microstructures is a convex structure.

In the transfer printing apparatus according an embodiment of the invention, parts of the transfer printing microstructures are non-uniformly arranged.

In the transfer printing apparatus according an embodiment of the invention, the second concavity has two edges opposite to each other, and the first plane extends from one of the edges of the second concavity into the second concavity, and the second plane extends from another one of the edges of the second concavity into the second concavity and connects to the first plane.

In summary, the embodiments of the invention have at least the following advantages: In the embodiments of the invention, the mold has the first concavity and the second concavity, and the stamper is disposed in the first concavity of the mold, such that the second optical microstructures and the taper may be manufactured on the base film in transfer printing way by the second concavity of the mold and the second transfer printing microstructures of the stamper. Since above manufacturing method does not adopt an injection moulding process, the light guiding film may be manufactured with a relatively smaller thickness. Besides, since the second transfer printing microstructures are formed on the stamper instead of being engraved directly on the mold, when it is required to alter a distribution manner or structure shape of the optical microstructures on the light guiding film, the transfer printing roller does not need to be re-engraved but only the stamper is to be replaced, such that manufacturing process may be simplified to reduce manufacturing costs.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
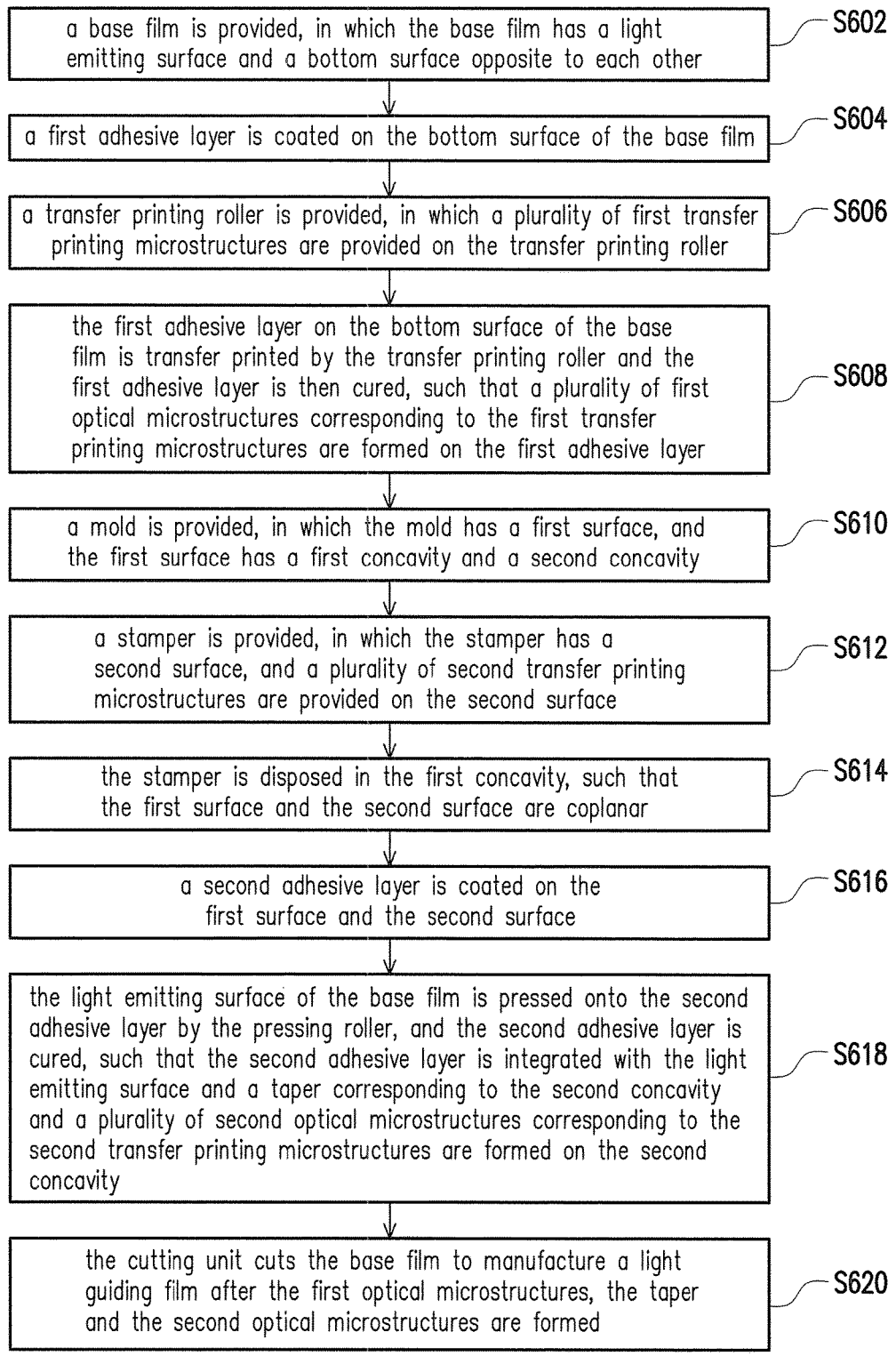
FIG. 1 is a flowchart illustrating a manufacturing method of light guiding film according to an embodiment of the invention.
Figure 2A:
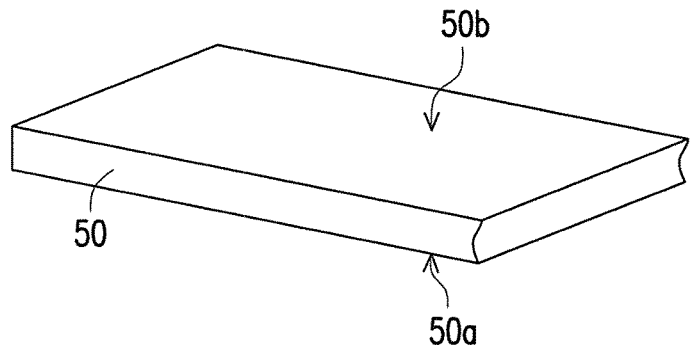
FIGS. 2A to 2C are partial steps of the manufacturing method of light guiding film depicted in FIG. 1.
Figure 2B:
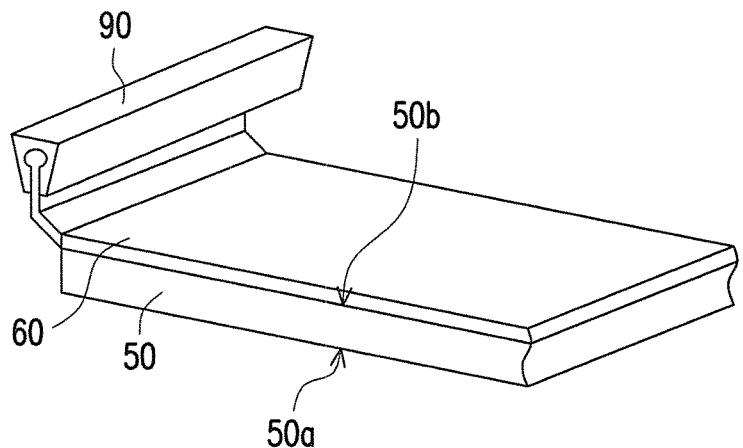
Figure 2C:
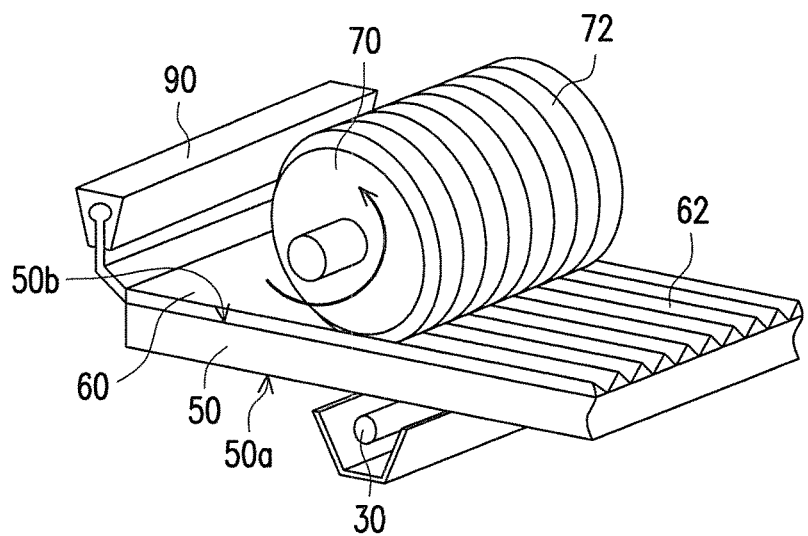

FIG. 1 is a flowchart illustrating a manufacturing method of light guiding film according to an embodiment of the invention. FIGS. 2A to 2C are partial steps of the manufacturing method of light guiding film depicted in FIG. 1. Referring to FIG. 1 and FIGS. 2A to 2C, a base film 50 is provided as shown in FIG. 2A, in which the base film 50 has a light emitting surface 50a and a bottom surface 50b opposite to each other (step S602). In the embodiment, the base film 50 is, for example, a material suitable for a backlight module, such as polymethyl methacrylate (PMMA), polycarbonate (PC) or other appropriate materials. As shown in FIG. 2B, a first adhesive layer 60 is coated on the bottom surface 50b of the base film 50 (step S604), in which the first adhesive layer 60 is provided by, for example, a dispensing unit 90. As shown in FIG. 2C, a transfer printing roller 70 is provided, in which a plurality of first transfer printing microstructures 72 are provided on the transfer printing roller 70 (step S606). Next, the first adhesive layer 60 on the bottom surface 50b of the base film 50 is transfer printed by the transfer printing roller 70 and the first adhesive layer 60 is then cured, such that a plurality of first optical microstructures 62 corresponding to the first transfer printing microstructures 72 are formed on the first adhesive layer 60 (step S608), in which the first adhesive layer 60 is, for example, a light curing adhesive film, and the first adhesive layer 60 is cured by, for example, utilizing light emitted by a curing unit 30 to irradiate the first adhesive layer 60. In the embodiment, the first adhesive layer 60 is cured by, for example, only irradiating the first adhesive layer 60 with a UV light without utilizing other equipments for heating.

Figure 3A:
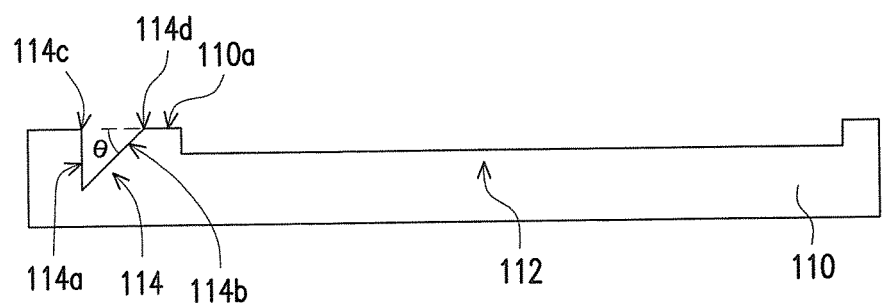
FIGS. 3A to 3C are partial steps of the manufacturing method of light guiding film depicted in FIG. 1.
Figure 3B:
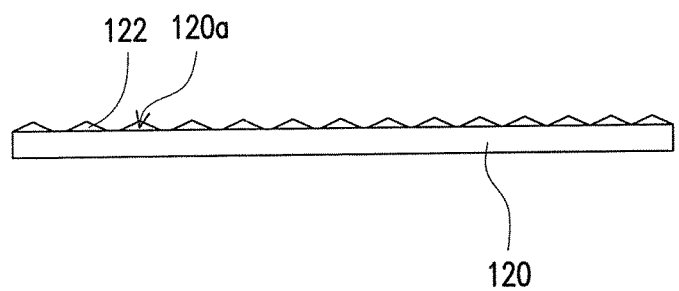
Figure 3C:
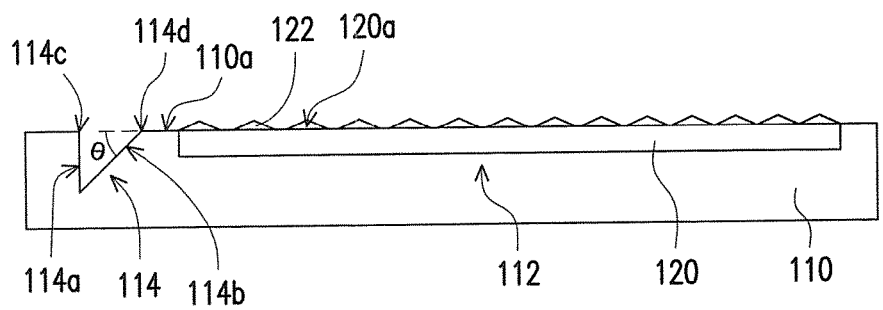

FIGS. 3A to 3C are partial steps of the manufacturing method of light guiding film depicted in FIG. 1. Referring to FIG. 1 and FIGS. 3A to 3C, a mold 110 is provided as shown in FIG. 3A, in which the mold 110 has a first surface 110a, and the first surface 110a has a first concavity 112 and a second concavity 114 (step S610). More specifically, the mold 110 is manufactured by forming a first plane 114a and a second plane 114b in the second concavity 114, in which the second plane 114b is located between the first plane 114a and the first concavity 112; the second concavity 114 has two edges 114c and 114d opposite to each other; the first plane 114a extends from the edge 114c of the second concavity 114 into the second concavity 114; the second plane 114b extends from the other edge 114d into the second concavity 114 and connects to the first plane 114a; the first plane 114a is perpendicular to the first surface 110a, and the second second plane 114b is inclined to the first surface 110a, such that the second concavity 114 is presented as a taper. Next, a stamper 120 is provided as shown FIG. 3B, in which the stamper 120 has a second surface 120a, and a plurality of second transfer printing microstructures 122 are provided on the second surface 120a (step S612). A material of the stamper 120 is, for example, nickel or other appropriate materials, the second transfer printing microstructures 122 are, for example, convex dots or concave dots, formed by etching, lasering, electroforming or other appropriate methods, but the invention is not limited to the above. As shown in FIG. 3C, the stamper 120 is disposed in the first concavity 112, such that the first surface 110a and the second surface 120a are coplanar (step S614).

Figure 4A:
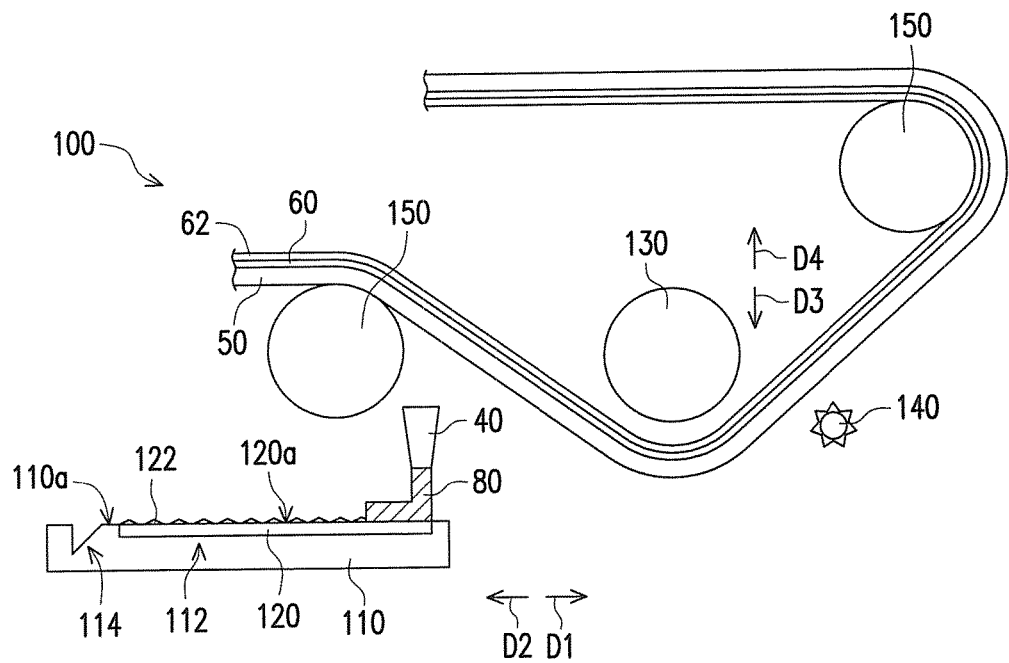
FIGS. 4A to 4D are partial steps of the manufacturing method of light guiding film depicted in FIG. 1.

FIGS. 4A to 4D are partial steps of the manufacturing method of light guiding film depicted in FIG. 1. Referring first to FIG. 4A, a transfer printing apparatus 100 of the embodiment includes said mold 110, said stamper 120, a pressing roller 130, a curing unit 140 and at least one transport roller 150 (two of which are illustrated herein, but the invention is not limited thereto). Said base film 50 is, for example, a flexible film suitable to be rolled by the transport roller 150 and the pressing roller 130 after manufacturing process of the first adhesive layer 60 and the first optical microstructure 62 on the base film 50 is completed as shown in FIG. 2C. The transport roller 150 is suitable to drive the base film 50 to move and pass the pressing roller 130, so as perform the transfer printing. Detailed explanations are given below.

Figure 4B:
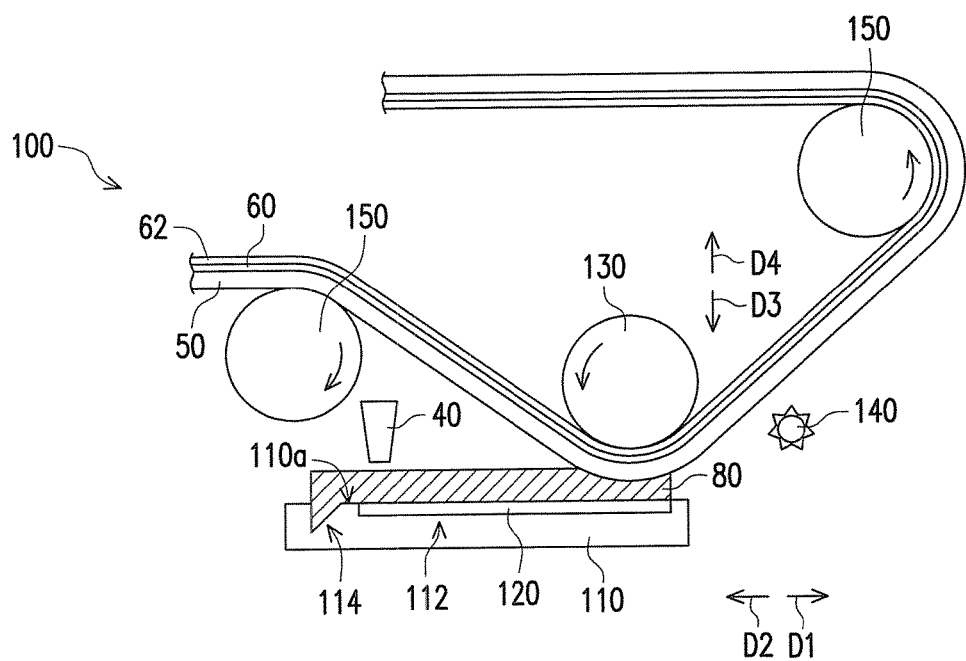
Figure 4C:
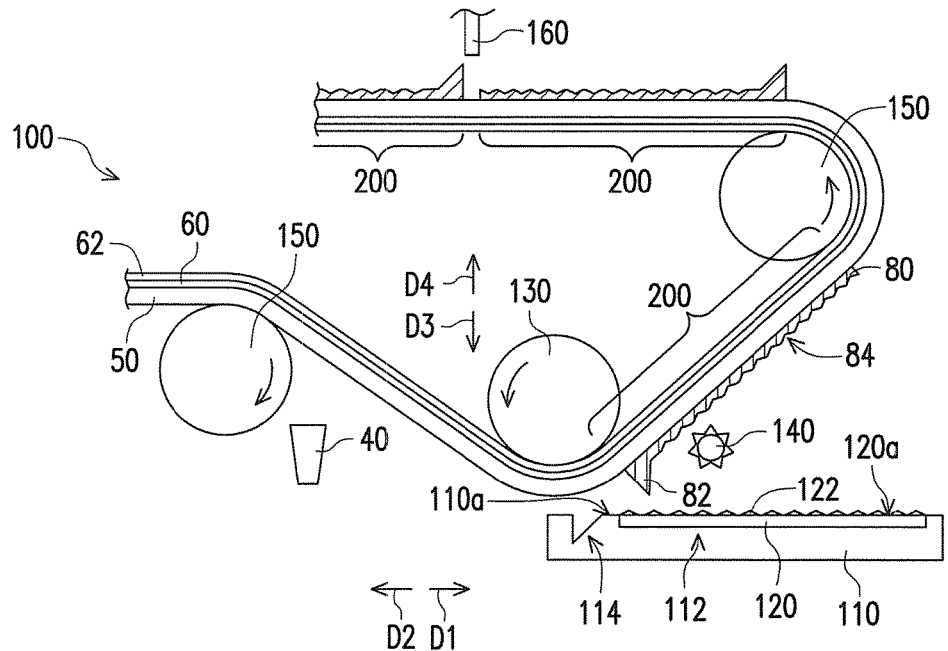

Referring to FIG. 1 and FIGS. 4A to 4D, as shown in FIGS. 4A to 4B, a second adhesive layer 80 is coated on the first surface 110*a* and the second surface 120*a* (step S616), in which the second adhesive layer 80 is, for example, provided by another dispensing unit 40. As shown in FIG. 4B, the pressing roller 130 is driven to move down along a direction D3 so the light emitting surface 50*a* (as marked in FIGS. 2A to 2C) of the base film 50 may be pressed onto the second adhesive layer 80 by the pressing roller 130, and the second adhesive layer 80 may then be cured, such that the second adhesive layer 80 may be integrated with the light emitting surface 50*a* and a taper 82 corresponding to the second concavity 114 and a plurality of second optical microstructures 84 corresponding to the second transfer printing microstructures 122 may be formed on the second concavity 80, as shown in FIG. 4C (step S618). The second adhesive 80 is, for example, a light curing adhesive film, and the second adhesive layer 80 is cured by, for example, utilizing light emitted from a curing unit 140 to irradiate the second adhesive layer 80. In the embodiment, the second adhesive layer 80 is cured by, for example, only irradiating the second adhesive layer 80 with a UV (ultraviolet) light without utilizing other equipments for heating. The curing unit 140 is, for example, an UV light emitting device which is capable of curing the second adhesive layer 80 wherein the second adhesive layer 80 is a kind of UV curable resin. However, the invention is not limited thereto, the curing unit 140 can also be an UV curing equipment or other device capable of curing the second adhesive layer 80.

Figure 4D:
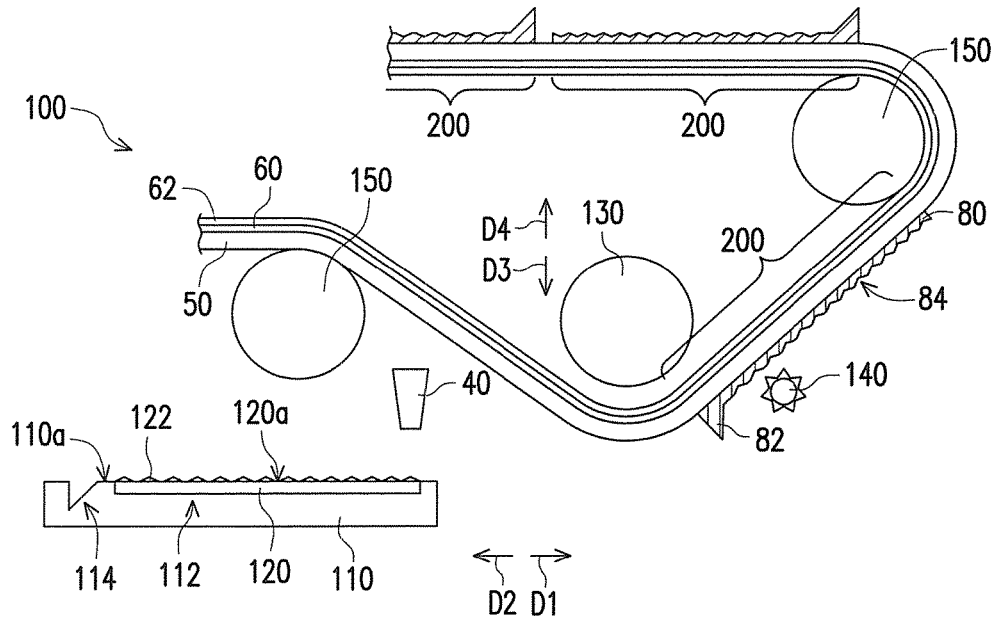

In above manufacturing process, the mold 110 is driven to move along a direction D1 so the second adhesive layer 80 may be coated completely on the first surface 110*a* and the second surface 120*a*, and when the pressing roller 130 performs the transfer printing to the base film 50, the mold is moved synchronously with base film along the direction D1, such that the second adhesive layer 80 may be completely integrated with base film 50. As shown in FIG. 4C, the transfer printing apparatus 100 of the embodiment further includes a cutting unit 160, and the cutting unit 160 cuts the base film 50 to manufacture a light guiding film 200 after the first optical microstructures 62, the taper 82 and the second optical microstructures 84 are formed (step S620). The cutting unit 160 is a punching device wherein a knife is disposed on a die of the punching device. However, the invention is not limited thereto, the cutting unit 160 can also be a laser cutting device or other device capable of cutting the base film 50. FIG. 4C schematically illustrates the base film 50 in which manufacturing of the first optical microstructures 62, the taper 82 and the second optical microstructures 84 is completed, and the transport roller 150 is configured to sequentially transport the base films 50 pending to be cut to the cutting unit 60 for cutting. After the transfer printing process as illustrated in FIGS. 4A to 4C is completed, as shown in FIG. 4D, the mold 110 may be driven back to its initial position along a direction D2, and the pressing roller 130 may be driven to move up to its initial position along a direction D4, so the transfer printing process as illustrated in FIGS. 4A to 4C may be performed again to manufacture more of the light guiding film 200.

Since above manufacturing method does not adopt an injection moulding process, the light guiding film 200 may be manufactured to include a relatively smaller thickness. Besides, since the second transfer printing microstructures 122 are formed on the stamper 120 instead of being engraved directly on the mold 110, when it is required to alter a distribution manner or structure shape of the second optical microstructures 84 on the light guiding film 200, the transfer printing roller does not need to be re-engraved but only the stamper is to be replaced, such that manufacturing process may be simplified to reduce manufacturing costs.

In the embodiment, the second transfer printing microstructures 122 depicted in FIG. 3C are, for example, formed as convex structures and distribution density of said microstructures is of a non-uniformly arrangement, such that the second optical microstructures 84 corresponding to the second transfer printing microstructures 122 depicted in FIG. 4C may be formed as a plurality of concave structures which are non-uniformly arranged. Furthermore, in the transfer printing process depicted in FIG. 2C, the first optical microstructures 62 are formed as a plurality of convex structures which are uniformly arranged. The second transfer printing microstructures 122 may be arranged non-uniformly in distribution density, size, shape or height of said microstructures, partly or entirely, but the invention is not limited to the above.

Figure 5:
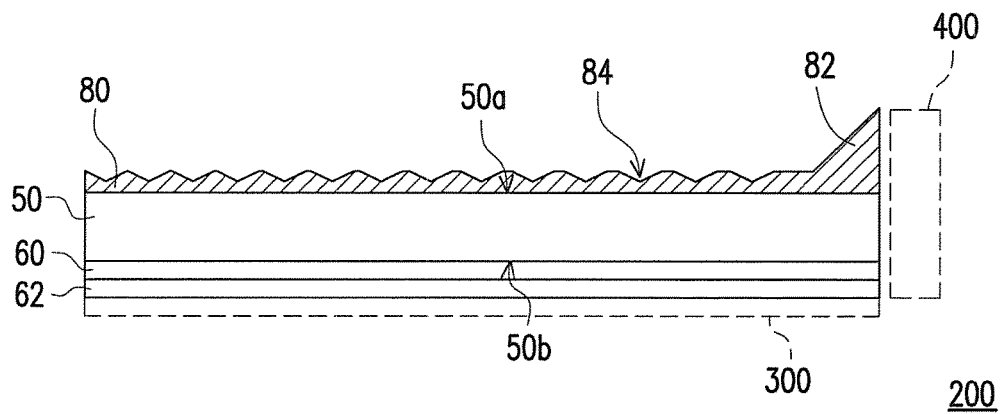
FIG. 5 is a schematic diagram of the light guiding film depicted in FIG. 4C.

FIG. 5 is a schematic diagram a structure of the light guiding film depicted in FIG. 4C. Referring to FIG. 5, in the structure of the light guiding film 200 manufactured in above process, the taper 82 and the second optical microstructures 84 are transfer printed by the mold 110 and the stamper 120 depicted in FIG. 3C to locate on the same side of the base film 50 (i.e., the light emitting surface 50*a*). Accordingly, this may solve problem of positioning being difficult due to the taper 82 and the non-uniformly arranged second optical microstructures 84 being respectively transfer printed on different sides of the base film 50. In addition, since the first optical microstructures 62 are uniformly arranged, problem of inaccurate positioning of the taper 82 and the first optical microstructures 62 may not occur when the taper 82 and the first optical microstructures 62 are respectively transfer printed to different sides of the base film 50 as shown in FIG. 5.

Referring to FIG. 5, in the light guiding film 200 manufactured according to the above process, the first optical microstructures 62 (e.g., convex structures) are located on the bottom surface 50*b* of the base film 50, and the second optical microstructures 84 (e.g., concave structures) are located on the light emitting surface 50*a* of the base film 50. This arrangement allows a reflector 300 to contact the convex structures instead of concave structures, so as to avoid problem of the light being emitted non-uniformly due to electrostatic adhesion between the bottom surface 50*b* of the light guiding film 200 and the reflector 300. Furthermore, the second optical microstructures 84 are located on the light emitting surface 50*a* of the base film 50 without contacting the reflector 300, thus it is not required to design the second optical microstructures 84 in convex structures so as to avoid said problem of electrostatic adhesion, instead, the second optical microstructures 84 may be designed in concave structures having a more preferable light emitting efficiency. In addition, after entering the light guiding film 200, light emitted by a light source 400 of a backlight module may only be emitted by the light emitting surface 50a after multiple reflections by the second optical microstructures 84 located on the light emitting surface 50a, this allows the light to be emitted more uniformly and avoids hot spot from generating on the light emitting surface 50a.

In the mold 110 of the embodiment, an included angle θ (marked in FIGS. 3A and 3C) between the second plane 114b and the first surface 114a in the second concavity 114 is, for example, between 2.5 degrees to 5 degrees, such that the taper 82 depicted in FIG. 5 may have an appropriate shape after being transfer printed by the second concavity 114 of the mold 110, so as to offer a favorable effect in transferring the light emitted by the light source 400.

Figure 6:
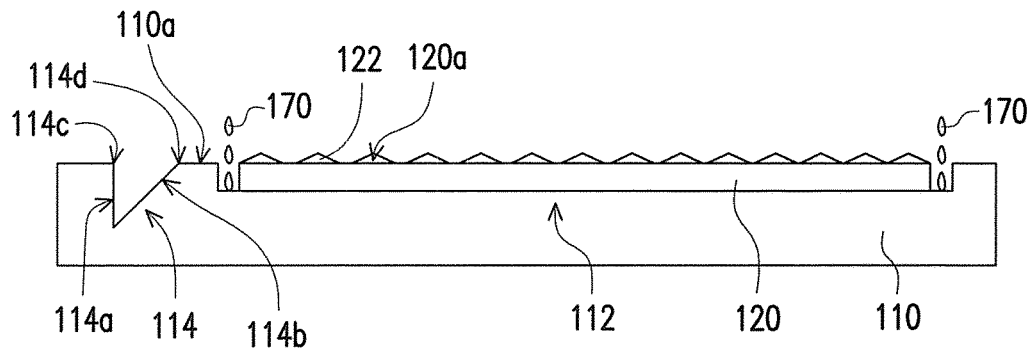
FIG. 6 illustrates an integration method for the mold and the stamper depicted in FIG. 3C.

In the embodiment, as shown in FIG. 4B, a thickness of the second adhesive layer 80 coated on the first surface 110a and the second surface 120a is, for example, between 5 μm and 20 μm, thus, it is required that the mold 110 and the stamper 120 are manufactured with a ultra-precision processing method as described in detail below. First, the mold 110 is manufactured with its surface coated with Nickel-Phosphorus alloy, so that an ultra-precision processing machine may utilize a diamond blade to plane the surface of the mold 110 as to obtain a surface roughness of below 10 nm. FIG. 6 illustrates an integration method for the mold and the stamper depicted in FIG. 3C. After the surface of the mold 110 is planed by utilizing the diamond blade, an adhesive material 170 is provided as shown in FIG. 6, the adhesive material 170 is, for example, a light curing adhesive material. The adhesive material 170 is filled at a gap between an inner wall of the first concavity 112 and the stamper 120, and the adhesive material 170 is cured by utilizing a light to irradiate the adhesive material 170, such that the stamper 120 may be stably integrated in the first concavity 112 of the mold 110.

Figure 7A:
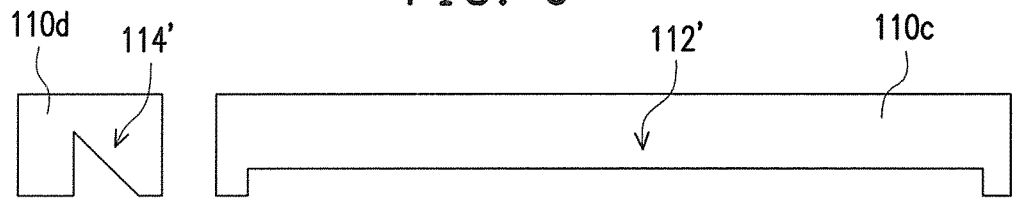
FIGS. 7A to 7B illustrate a manufacturing process of the mold according to another embodiment of the invention.
Figure 7B:
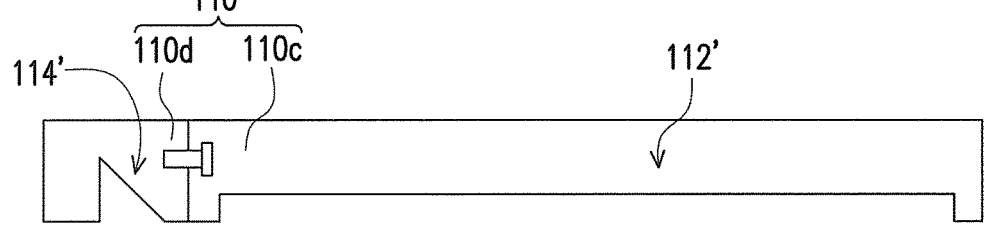

FIGS. 7A to 7B illustrate a manufacturing process of the mold according to another embodiment of the invention. Referring to FIG. 7A, first, a first component 110c and a second component 110d are provided, in which a first concavity 112' is formed at the first component 110c and a second concavity 114' is formed at the second component 110d. Next, as shown in FIG. 7B, the first component 110c is assembled to the second component 110d so as to build up a mold 110'. When the manufacturing of the first concavity 112' and the second concavity 114' cannot be completed by utilizing one single mold in the ultra-precision processing, above method may be applied to manufacture the first concavity 112' and the second concavity 114' respectively on the first component 110c and the second component 110d, so that the first component 110c and the second component 110d may then be assembled to complete the manufacturing of the mold 110'.

In summary, the embodiments of the invention have at least the following advantages: In the embodiments of the invention, the mold has the first concavity and the second concavity, and the stamper is disposed in the first concavity of the mold, such that the second optical microstructures and the taper may be manufactured on the base film in transfer printing way by the second concavity of the mold and the second transfer printing microstructures of the stamper. Since above manufacturing method does not adopt a injection moulding process, the light guiding film may be manufactured with a relatively smaller thickness. Besides, since the second transfer printing microstructures are formed on the stamper instead of being engraved directly on the mold, when it is required to alter a distribution manner or structure shape of the optical microstructures on the light guiding film, the transfer printing roller does not need to be re-engraved but only the stamper is to be replaced, such that manufacturing process may be simplified to reduce manufacturing costs. Furthermore, the taper and the second optical microstructures are transfer printed by the mold and the stamper to locate on the same side of the base film, thus, this may solve the issue of positioning being difficult due to the taper and the non-uniformly arranged second optical microstructures being respectively transfer printed on different sides of the base film. Moreover, the first optical microstructures (e.g., convex structures) are located on the bottom surface of the base film, and the second optical microstructures (e.g., concave structures) are located on the light emitting surface of the base film, thus the reflector does not contact with the concave structures but with the convex structures, such that the problem of the light being emitted non-uniformly due to electrostatic adhesion between the bottom surface of the light guiding film and the reflector may be solved. In addition, after entering the light guiding film, light emitted by a light source may be emitted through the light emitting surface after multiple reflections by the concave structures located on the light emitting surface, this allows the light to be emitted more uniformly and avoids hot spot from generating on the light emitting surface.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A manufacturing method of light guiding film, comprising:
   providing a base film, wherein the base film has a light emitting surface and a bottom surface opposite to each other;
   coating a first adhesive layer on the bottom surface of the base film;
   providing a transfer printing roller, wherein a plurality of first transfer printing microstructures are provided on the transfer printing roller;
   performing transfer printing to the first adhesive layer on the bottom surface of the base film by the transfer printing roller and curing the first adhesive layer, such that a plurality of first optical microstructures corresponding to the first transfer printing microstructures is formed on the first adhesive layer;
   providing a mold, wherein the mold has a first surface, and the first surface has a first concavity and a second concavity;
   providing a stamper, wherein the stamper has a second surface, and a plurality of second transfer printing microstructures are provided on the second surface;
   disposing the stamper in the first concavity, such that the first surface and the second surface are coplanar;
   coating a second adhesive on the first surface and the second surface;
   pressing the light emitting surface of the base film onto the second adhesive layer by a pressing roller and curing the second adhesive layer, such that the second adhesive are integrated with the light emitting surface and a taper corresponding to the second concavity and a plurality of second optical microstructures corresponding to the second transfer printing microstructures are formed on the second adhesive layer; and
   cutting the base film to manufacture at least one light guiding film after the first optical microstructures, the taper and the second optical microstructures are formed.

2. The manufacturing method of light guiding film of claim 1, wherein the first adhesive layer is a light curing adhesive film, and the step of curing the first adhesive layer comprises:
   utilizing a light to irradiate the first adhesive layer.

3. The manufacturing method of light guiding film of claim 1, wherein the step of forming the first optical microstructures comprises:
   forming the first optical microstructures as a plurality of convex structures uniformly arranged.

4. The manufacturing method of light guiding film of claim 1, wherein the second concavity of the mold has a first plane and a second plane, wherein the first plane is perpendicular to the first surface, and the second plane is inclined to the first surface.

5. The manufacturing method of light guiding film of claim 4, wherein an included angle between the second plane and the first surface is between 2.5 degrees to 5 degrees.

6. The manufacturing method of light guiding film of claim 5, wherein the second plane is located between the first plane and the first concavity.

7. The manufacturing method of light guiding film of claim 1, wherein the mold has a first component and a second component, the first concavity is located at the first component, and the second concavity is located at the second component.

8. The manufacturing method of light guiding film of claim 1, wherein an adhesive material is provided at a gap between an inner wall of the first concavity and the stamper.

9. The manufacturing method of light guiding film of claim 8, wherein the adhesive material is a light curing adhesive material.

10. The manufacturing method of light guiding film of claim 1, further comprising:
    driving the base film to move and pass the pressing roller by at least one transport roller when pressing the light emitting surface of the base film onto the second adhesive layer by the pressing roller.

11. The manufacturing method of light guiding film of claim 10, further comprising:
    driving the mold to move with the base film synchronously when pressing the light emitting surface of the base film onto the second adhesive layer by the pressing roller, such that second adhesive layer is completely integrated with the light emitting surface of the base film.

12. The manufacturing method of light guiding film of claim 1, wherein the second adhesive layer is a light curing adhesive film, and the step of curing the second adhesive layer comprises:
    utilizing a light to irradiate the second adhesive layer.

13. The manufacturing method of light guiding film of claim 1, wherein parts of the second optical microstructures comprise:
    a plurality of concave structures non-uniformly arranged.

14. The manufacturing method of light guiding film of claim 1, wherein the steps of curing the first adhesive layer and the second adhesive layer is performed without heating the first adhesive layer and the second adhesive layer.

* * * * *